United States Patent
Jaber et al.

(10) Patent No.: US 8,321,929 B2
(45) Date of Patent: Nov. 27, 2012

(54) SYSTEM AND METHOD FOR IMPLEMENTING A ONE TIME PASSWORD AT AN INFORMATION HANDLING SYSTEM

(75) Inventors: Muhammed K. Jaber, Austin, TX (US); Frank Molsberry, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 1283 days.

(21) Appl. No.: 12/053,698

(22) Filed: Mar. 24, 2008

(65) Prior Publication Data

US 2009/0241182 A1  Sep. 24, 2009

(51) Int. Cl.
*G06F 7/04* (2006.01)
*G06F 9/00* (2006.01)

(52) U.S. Cl. .............................. 726/16; 713/2

(58) Field of Classification Search .............. 726/16; 713/2
See application file for complete search history.

(56) References Cited

U.S. PATENT DOCUMENTS

| | | | |
|---|---|---|---|
| 5,841,871 A | 11/1998 | Pinkas | |
| 6,067,621 A * | 5/2000 | Yu et al. | 713/172 |
| 6,983,381 B2 | 1/2006 | Jerdonek | |
| 2004/0243994 A1* | 12/2004 | Nasu | 717/171 |
| 2006/0085845 A1* | 4/2006 | Davis et al. | 726/6 |
| 2007/0061868 A1* | 3/2007 | Dvir | 726/2 |
| 2007/0130472 A1* | 6/2007 | Buer et al. | 713/182 |
| 2007/0234063 A1* | 10/2007 | Ueda et al. | 713/183 |
| 2007/0277044 A1* | 11/2007 | Graf et al. | 713/185 |
| 2008/0072058 A1* | 3/2008 | Cedar et al. | 713/184 |
| 2008/0184036 A1* | 7/2008 | Kavsan | 713/184 |
| 2008/0263378 A1* | 10/2008 | Challener et al. | 713/323 |

* cited by examiner

*Primary Examiner* — Techane Gergiso
(74) *Attorney, Agent, or Firm* — Hamilton & Terrile, LLP; Robert W. Holland

(57) ABSTRACT

A system and method are provided which substantially reduce the disadvantages and problems associated with previous methods and systems for generating an OTP at an information handling system. An OTP is generated at an information handling system hardware or firmware layer upon detection of a predetermined input trigger, such as a key combination. The OTP is provided for authentication independent of an operating system or applications running on the information handling system.

20 Claims, 3 Drawing Sheets

SYSTEM AND METHOD FOR IMPLEMENTING A ONE TIME PASSWORD AT AN INFORMATION HANDLING SYSTEM

BACKGROUND OF THE INVENTION

1. Field of the Invention

The present invention relates in general to the field of information handling system security, and more particularly to a system and method for implementing a one-time password at an information handling system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems have made life easier for businesses and individuals by making information readily available. For example, end users access business accounts to transact all sorts of business at all hours of the day. On-line bank accounts provide individuals with access to finances for transferring funds and paying bills from home, from the office or from wireless hotspots located throughout the world. Employees have access to work files through Internet connections to enterprise servers to allow work from home or virtually any location having an Internet connection. In many instances, information sent through the Internet is highly sensitive. Often, a substantial risk exists if such sensitive information gets into the wrong hands. For example, an individual can have unauthorized withdrawals from compromised accounts and enterprises face liability to customers who are injured by illicit use of sensitive information. Generally, access to sensitive information is protected with passwords and encryption, however, passwords sometimes fall into the wrong hands and no encryption method is foolproof.

In order to provide increased security, enterprises are increasingly turning to a multi-factor authentication solution for employee and customer access to sensitive information, such as remote banking or remote access. Thus, in addition to the use of password protection, enterprises also require a One Time Password (OTP) to authorize access to sensitive information. OTPs are typically generated by algorithms running on dedicated hardware devices, such as a key fob that generates and displays an OTP valid for a single use. One problem with OTPs is that the use of dedicated hardware devices increases the expense and complexity of implementing an OTP verification system. For example, losing or misplacing a dedicated hardware device means that an end user cannot access information until the device is replaced and the account is reset. One solution for implementing OTP without a dedicated device is to run the OTP algorithm in application embedded in an information handling system. Such embedded systems typically present the OTP through a display or software interface from an operating system of application layer, however, communication of the OTP through an operating system or application layer makes the OTP vulnerable to exploitation, such as by hackers who have gained access to an information handling system through a malicious program running on the information handling system.

SUMMARY OF THE INVENTION

Therefore, a need has arisen for a system and method that generates an OTP at an information handling system that is protected from exploitation through the operating system or an application of the information handling system.

In accordance with the present invention, a system and method are provided which substantially reduce the disadvantages and problems associated with previous methods and systems for generating an OTP at an information handling system. An OTP is generated at an information handling system hardware or firmware layer upon detection of a predetermined input trigger, such as a key combination. The OTP is provided for authentication independent of an operating system or applications running on the information handling system.

More specifically, an OTP module runs on an information handling system in a hardware or firmware layer to generate OTPs independent of operating system and application layers. For example, the OTP module is dedicated hardware or firmware running on existing hardware, such as a keyboard controller, so that access to the OTP module is restricted from the operating system or applications. A trigger, such as simultaneous activation of predetermined keys, initiates generation of an OTP by the OTP module and provides the OTP for use at the information handling system independent of the operating system or applications running on the information handling system. For example, pressing <function><f6> generates an OTP and displays the OTP at a location associated with hardware or firmware information, such as at a cursor. In such an exemplary system, placement of the cursor in an input slot of an application followed by activation of an OTP trigger automatically inputs an OTP in the input slot, such as by populating a keyboard buffer.

The present invention provides a number of important technical advantages. One example of an important technical advantage is that an OTP is generated at a physical layer of an information handling system to provide increased protection from malicious programs associated with an operating system or application layer of the information handling system. The OTP is presented with an auxiliary display, a hardware cursor, or icon or a popup screen controlled from firmware, such as within the BIOS, so that access by the operating system layer or application layer is limited. Application interfaces are automatically populated with end user interaction through firmware for a convenient yet secure OTP implementation without dedicated hardware.

BRIEF DESCRIPTION OF THE DRAWINGS

The present invention may be better understood, and its numerous objects, features, and advantages made apparent to those skilled in the art by referencing the accompanying drawings. The use of the same reference number throughout the several figures designates a like or similar element.

DETAILED DESCRIPTION

Generating a one time password (OTP) at an information handling system independent of the operating system provides improved security for sensitive information managed by the information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
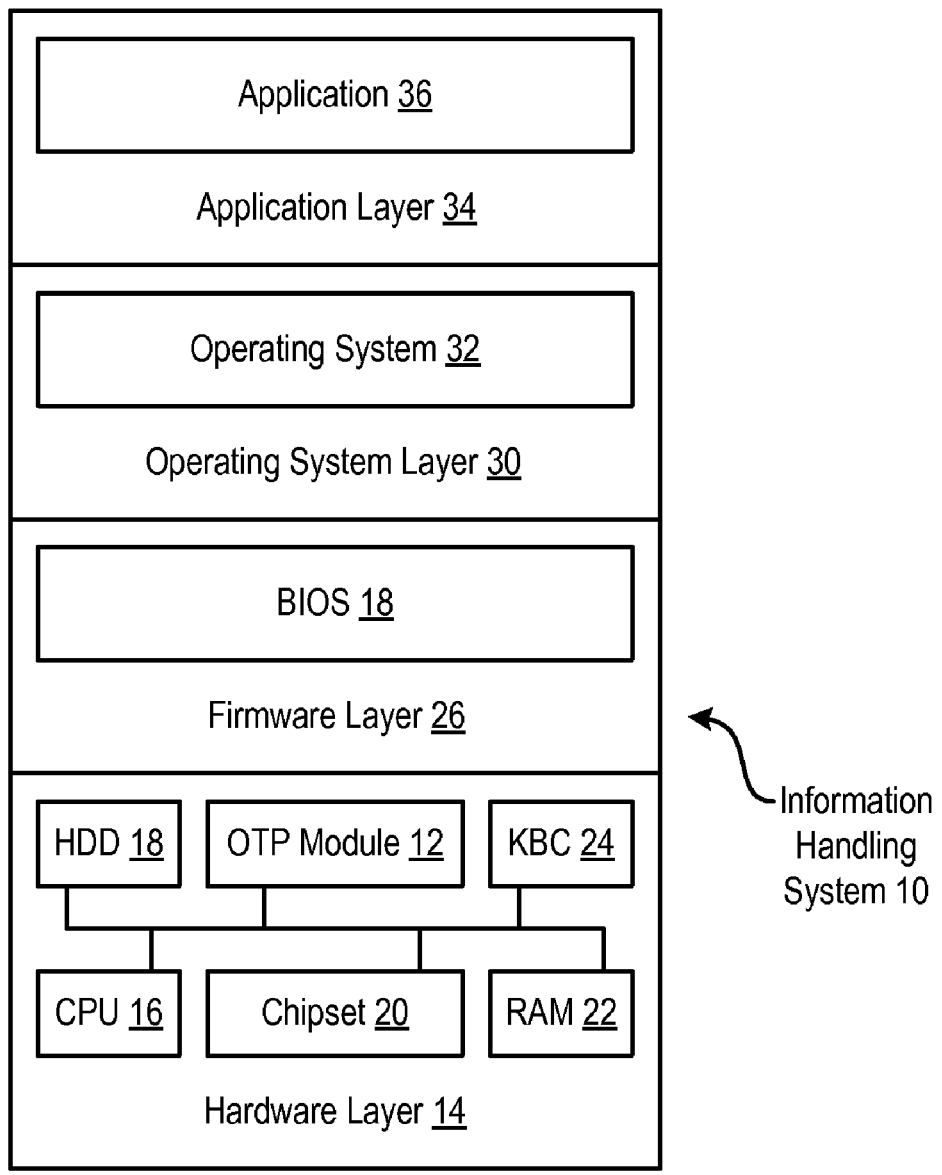
FIG. 1 depicts a block diagram of an information handling system having an OTP module.

Referring now to FIG. 1, a block diagram depicts an information handling system 10 having an OTP module 12. Information handling system 10 has a hardware layer 14 that includes a variety of processing components that cooperate to process information, such as a CPU 16, hard disk drive 18, chipset 20, RAM 22, a keyboard controller (KBC) 24 and an OTP module 12, which, in this example embodiment, is a dedicated hardware device that generates one time passwords. In some information handling systems, keyboard controller 24 works with or is included in an embedded controller. A firmware layer 26 operates on hardware layer 14 to coordinate interaction of processing components on a physical layer. For example, a Basic Input/Output System (BIOS) 28 runs in firmware layer 26 to coordinate power up and power down of the processing components and interaction with input devices, such as a keyboard, and output devices, such as a display. BIOS 28 generally includes firmware code running on information handling system 10, such as on chipset 20 and keyboard controller 24. An operating system layer 30 runs on the hardware layer 14 and over the firmware layer 26 to coordinate interactions between an end user and information handling system 10. For example, an operating system 32, such as WINDOWS or LINUX, has hardware drivers that are accessible to an application layer 34 running one or more applications 36, so that functions performed by the application have appropriate access to firmware and hardware components.

OTP module 12 allows an end user of information handling system 10 to generate and present an OTP independent of operating system layer 30 and application layer 34. For example, BIOS 28 controls communication with OTP module 12 so that OTP module 12 is not accessible by application layer 34 or operating system layer 30. Since OTP module 12 is inaccessible to applications 36 or operating system 32, malicious programs that attack applications and operating systems will not be able to generate an OTP. BIOS 28 retrieves an OTP from OTP module 12 based upon a predetermined event trigger and presents the OTP at a display independent of operating system 32. One example of a predetermined event trigger is the input at a keyboard of a unique key combination, such as <function> and <f6> keys. To remain independent of operating system 32, BIOS 28 presents the OTP at an auxiliary display or as a BIOS-generated character, such as a cursor, icon, arrow, or popup screen. In one embodiment, BIOS 28 populates an input slot of an application, such as by presenting the OTP as a cursor with the cursor placed in the input slot. Although FIG. 1 depicts OTP module 12 as a dedicated hardware device within hardware layer 14, in alternative embodiments, OTP module 12 can be implemented within existing hardware devices, such as keyboard controller 24, or as firmware instructions within firmware layer 26.

Figure 2:
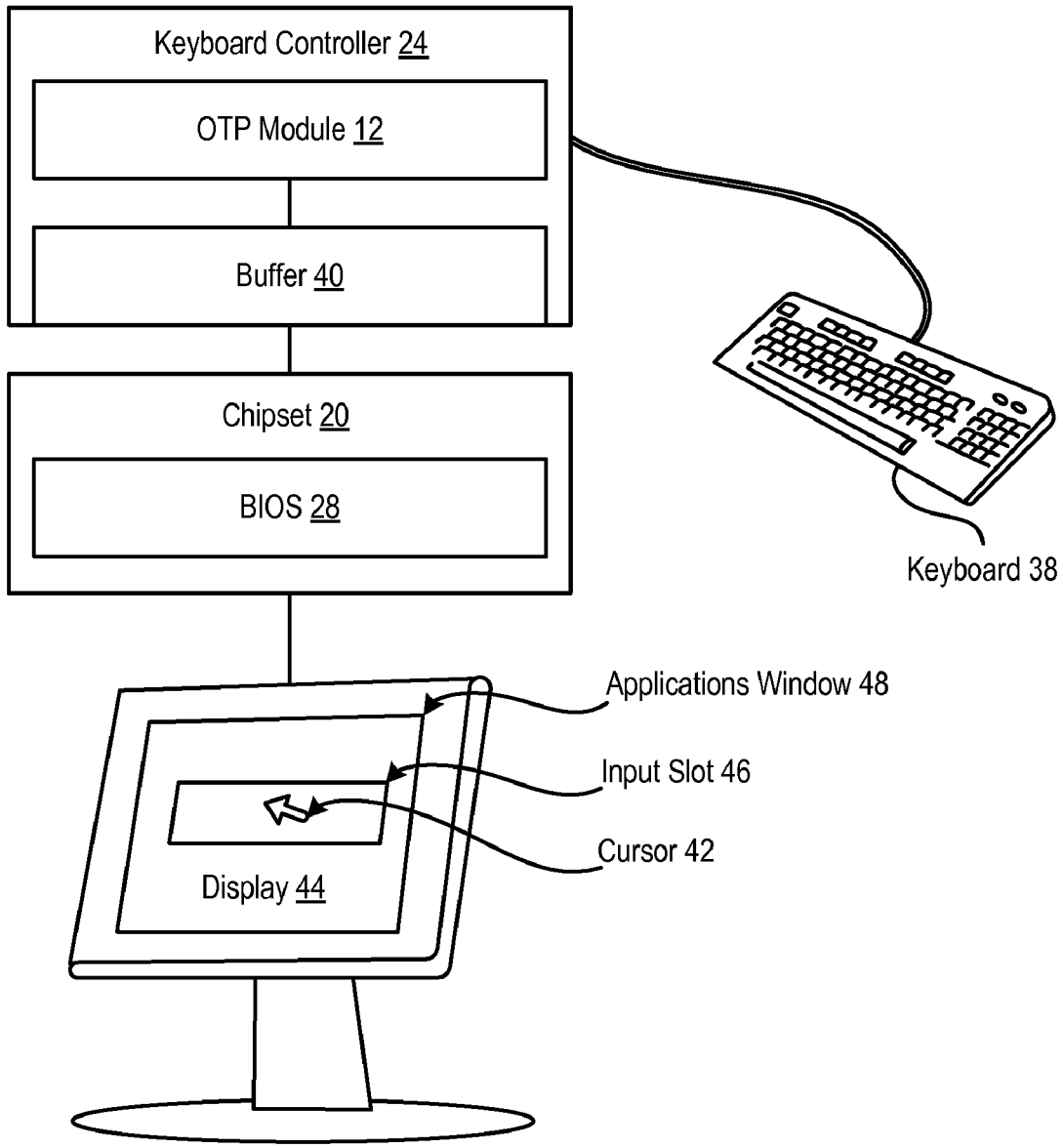
FIG. 2 depicts a block diagram of a system for generating an OTP at an information handling system independent of the operating system.

Referring now to FIG. 2, a block diagram depicts a system for generating an OTP at an information handling system independent of the operating system. A keyboard controller 24 accepts inputs from a keyboard 38 and passes the inputs through a keyboard buffer 40 to chipset 20. OTP module 12 is implemented as firmware instructions running on keyboard controller 24. If a predetermined key input is made at keyboard 38, such as simultaneous pressing of function and f6 keys, OTP module 12 is triggered to generate an OTP and to copy the OTP followed by <enter> in keyboard buffer 40. BIOS 28 recognizes the OTP and populates the OTP and <enter> values at the location of a cursor 42 presented at a display 44. The end user can selectively enter the OTP value in an input slot 46 of an application window 48, such as a browser window, by placing cursor 42 within input slot 46 and pressing the predetermined key combination. The <enter> value at the end of the OTP automatically communicates the OTP to the input slot independent of the operating system and application running on the information handling system.

Figure 3:
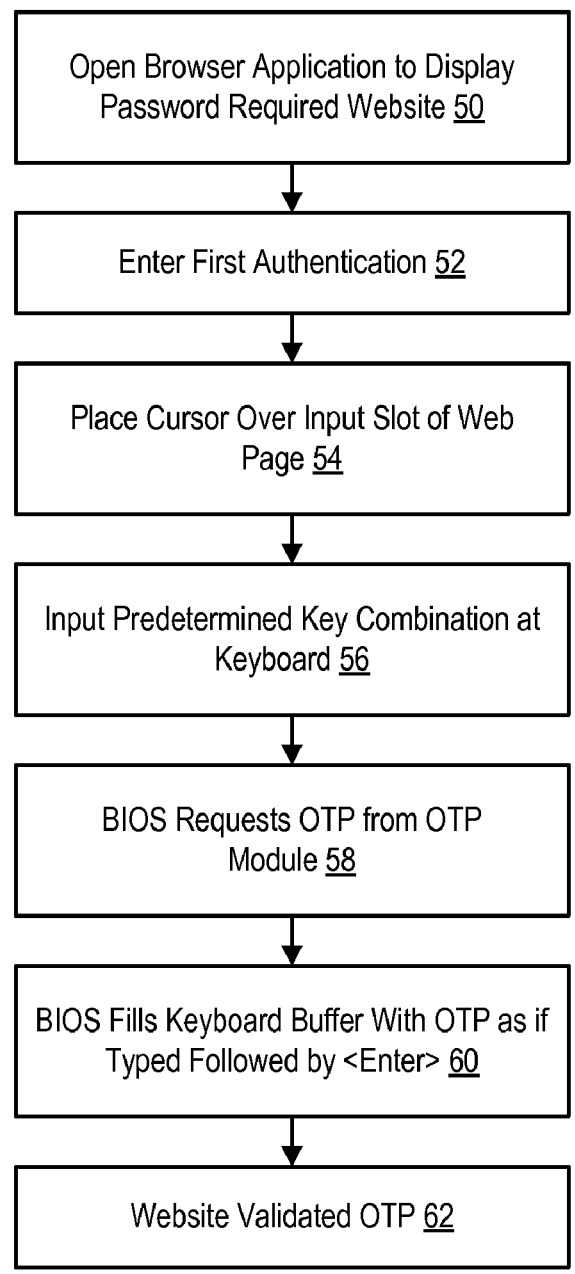
FIG. 3 depicts a flow diagram of a process for generating an OTP at an information handling system independent of the operating system.

Referring now to FIG. 3, a flow diagram depicts a process for generating an OTP at an information handling system independent of the operating system. The process begins at step 50 with the opening of a browser application to display a password-required website having a dual authentication by an OTP. At step 52, the password is entered to provide the first authentication and expose an input slot to accept an OTP. At step 54, the cursor is placed over the input slot of the browser webpage presentation. At step 56, the predetermined combination of simultaneous key inputs are made at a keyboard of the information handling system to trigger generation of the OTP at the hardware and firmware layers in the place of the cursor. At step 58, the BIOS of the information handling system responds to the OTP trigger by requesting an OTP from the OTP module. At step 60, the BIOS fills a keyboard buffer with the generated OTP followed by <enter> at the location of the cursor. At step 62, the OTP and enter values are automatically input at the location of the cursor so that the OTP is sent to through the browser webpage to authenticate the end user.

Although the present invention has been described in detail, it should be understood that various changes, substitutions, and alterations can be made hereto without departing from the spirit and scope of the invention as defined by the appended claims.

What is claimed is:

1. An information handling system comprising:
    a physical layer having physical components;
    an operating system layer running over the physical layer to coordinate operation of the physical components;
    an application layer running over the operating system layer and operable to generate information;
    an input device interfaced with the physical layer and operable to accept end user inputs;
    a display interfaced with the physical layer and operable to present the information as images; and
    a one time password (OTP) module running on a component integrated in the physical layer, the OTP module operable to generate an OTP in response to a predetermined request at the input device and to present the OTP at the display with the images, the OTP presented independent of the operating system layer and application layer.

2. The information handling system of claim 1 wherein the input device comprises a keyboard having keys and the predetermined request comprises a combination of key inputs.

3. The information handling system of claim 1 wherein the component that the OTP module runs on is a keyboard controller.

4. The information handling system of claim 3 wherein the OTP module presents the OTP by populating the OTP into a keyboard buffer associated with the keyboard controller.

5. The information handling system of claim 4 wherein the keyboard buffer comprises a cursor buffer, the cursor placed in an input slot of a presentation generated by an operating system of the operating system layer.

6. The information handling system of claim 4 wherein the keyboard buffer comprises a cursor buffer, the cursor placed in an input slot of a presentation generated by an application of the application layer.

7. The information handling system of claim 1 wherein the OTP module comprises firmware instructions running on a BIOS.

8. The information handling system of claim 1 wherein the OTP module comprises dedicated hardware integrated in the physical layer.

9. A method for generating an OTP at an information handling system independent of an operating system, the method comprising:
    requesting an OTP with a predetermined input at a physical input device of the information handling system;
    communicating the request for an OTP from the physical input device to an OTP module, the communicating independent of the operating system;
    generating information with an operating system for presentation as images at a display;
    in response to requesting an OTP, generating an OTP with the OTP module, the generating independent of the operating system; and
    presenting the OTP at the display of the information handling system with the images, the presenting the OTP independent of the operating system.

10. The method of claim 9 wherein requesting an OTP further comprises inputting a predetermined key combination at the input device.

11. The method of claim 9 wherein generating an OTP with the OTP module comprises running the OTP module as firmware on a keyboard controller.

12. The method of claim 9 wherein generating an OTP with the OTP module further comprises running the OTP as firmware in a BIOS.

13. The method of claim 9 wherein presenting the OTP at a display further comprises presenting the OTP as a cursor.

14. The method of claim 9 wherein presenting the OTP at a display further comprises presenting the OTP in a popup screen generated by firmware instructions.

15. The method of claim 9 wherein presenting the OTP at a display further comprises filling a keyboard buffer with the OTP followed by an enter key.

16. A system for generating an OTP at an information handling system display, the system comprising:
    a component integrated in a physical layer of the information handling system and operable to execute instructions;
    memory interfaced with the component and operable to store the instructions; and
    a one time password (OTP) module having instructions running on the component and stored in the memory, the OTP module operable to generate an OTP in response to a predetermined request at an input device of the information handling system and to present the OTP at the display independent of an operating system of the information handling system, the OTP presented while the display presents images generated by information processed under management of the operating system.

17. The system of claim 16 wherein the OTP module comprises firmware instructions operable to run on a keyboard controller of the information handling system.

18. The system of claim 16 wherein the OTP module presents the OTP at the display as a cursor.

19. The system of claim 16 wherein the OTP module comprises firmware instructions embedded in a BIOS of the information handling system.

20. The system of claim 16 wherein the OTP module comprises a dedicated hardware device integrated in the information handling system physical layer.

* * * * *